United States Patent [19]

Kumeta et al.

[11] Patent Number: 4,615,107
[45] Date of Patent: Oct. 7, 1986

[54] METHOD AND DEVICE FOR ASSEMBLING A FUEL CELL STACK

[75] Inventors: Masao Kumeta, Neyagawa; Masahiro Ide, Hirakata; Nobuyoshi Nishizawa, Neyagawa; Nobuya Inoue, Moriguchi; Hideki Goto, Hirakata, all of Japan

[73] Assignee: Sanyo Electric Co., Ltd., Moriguchi, Japan

[21] Appl. No.: 798,275

[22] Filed: Nov. 15, 1985

[30] Foreign Application Priority Data

Nov. 16, 1984 [JP] Japan .................... 59-242714

[51] Int. Cl.$^4$ ............................ H01M 8/00
[52] U.S. Cl. ........................ 29/623.1; 429/12
[58] Field of Search ............. 429/12; 29/623.1, 428, 29/469, 729, 730

[56] References Cited

U.S. PATENT DOCUMENTS

| 4,176,213 | 11/1979 | Linden | 429/34 X |
| 4,342,816 | 8/1982 | Kothmann et al. | 429/38 X |
| 4,430,390 | 2/1984 | Fekete | 429/34 |
| 4,444,851 | 4/1984 | Maru | 429/34 X |
| 4,548,875 | 10/1985 | Lance et al. | 429/34 |

Primary Examiner—Anthony Skapars
Attorney, Agent, or Firm—Armstrong, Nikaido, Marmelstein & Kubovcik

[57] ABSTRACT

A method for assembling fuel cell stack comprises the steps of alternately stacking the prescribed number of fuel cells and bipolar plates to form a plurality of substacks, arranging the laid substacks on a supporting base so that the central axes of the substacks parallel to the stacking direction of the fuel cell stack are on a horizontal straight line to form a complete fuel cell stack, tying up the fuel cell stack to apply a predetermined compressive load to the fuel cell components, making the fuel cell stack vertical, and then removing said supporting base from the fuel cell stack. The supporting base on which a plurality of fuel cell substacks is provided at its both end with a pair of side plates, and a pressure plate is slidably arranged on the base and connected to driving means.

5 Claims, 6 Drawing Figures

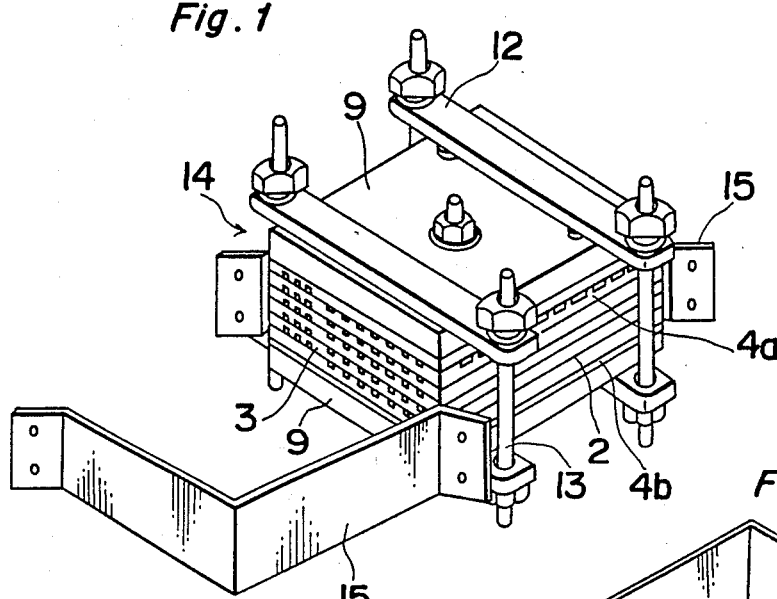
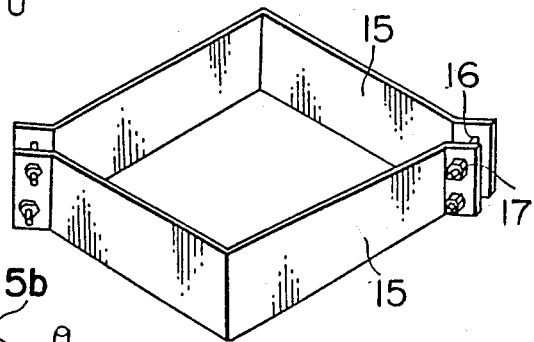
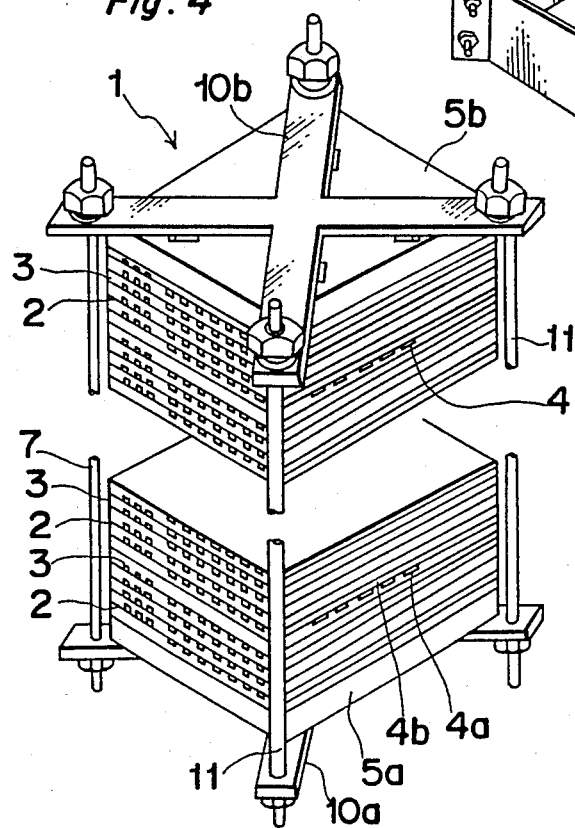

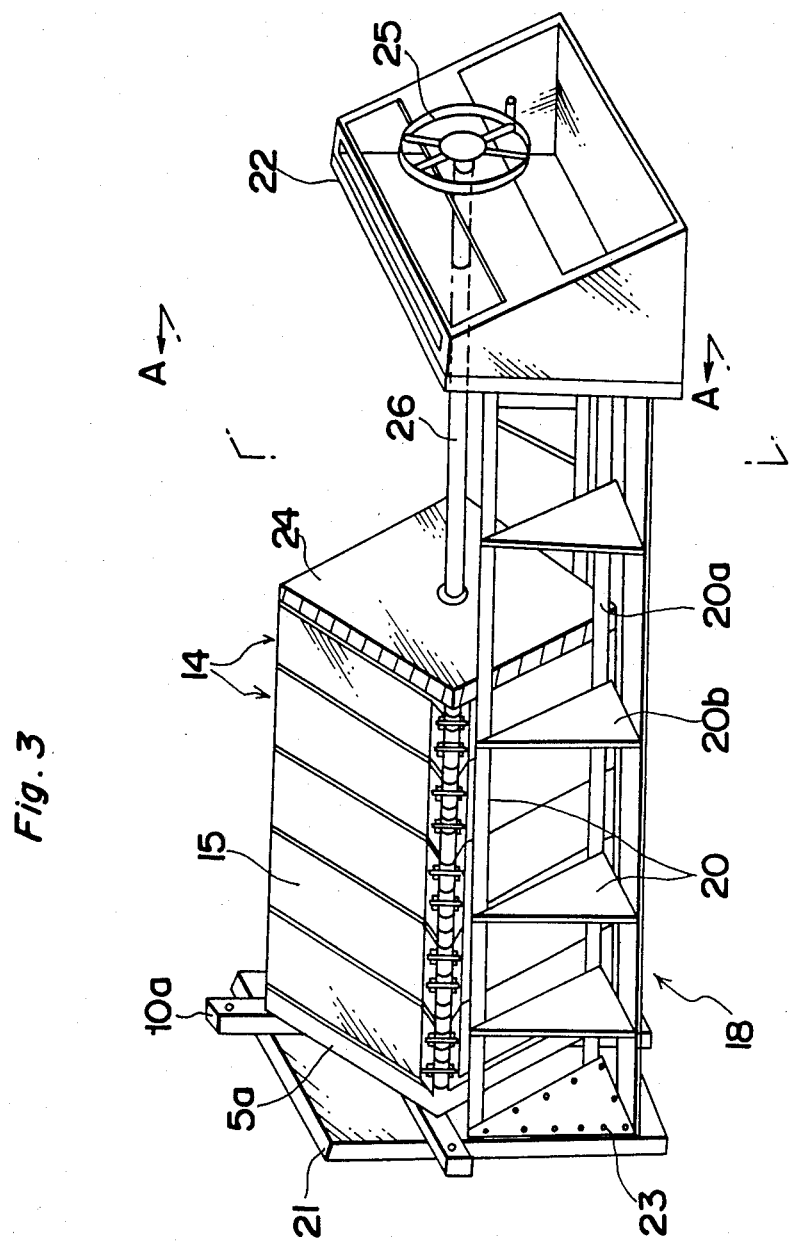

METHOD AND DEVICE FOR ASSEMBLING A FUEL CELL STACK

BACKGROUND OF THE INVENTION

1. Field of the Invention

This invention relates to a method and device for assembling a fuel cell stack. More particularly, the present invention relates to a method and device for assembling a fuel cell stack comprising a large number of fuel cells.

2. Description of the Prior Art

A fuel cell stack in a fuel cell system generally comprises a large number of fuel cells, a plurality of bipolar plates each being arranged between neighboring two fuel cells, and a plurality of cooling plates each being arranged every several fuel cells to cool the fuel cells and bipolar plates. In such a fuel cell system, a stacking accuracy of the fuel cell components has a great influence on the performance and sealing properties of the fuel cell system, so that it is required to stack the fuel cell components with high accuracy. However, with increasing the output power of the fuel cell system, the number of fuel cells increases and becomes more than 300, thus making it difficult to assemble the fuel cell stack with a high accuracy.

Heretofore, the fuel cell stack has been assembled, for example, using a simple jig as shown in FIG. 6 which comprises a base 7 and a few props 8 mounted vertically on the base 7, in such a manner that a plurality of fuel cells 2 and bipolar plates 3 are alternately placed one on top of the other so that they are in contact with the props 8 at their adjacent two edges to determine their position, and then tied up with tie bars and tie rods to complete a fuel cell stack 1 and to apply a predetermined compressive load to the fuel cell components to form a seal among them.

However, this method can not be applied to assembly of a fuel cell stack comprising hundreds of fuel cells for the following reasons.

1. The increase in the number of fuel cells causes a great inclination of a fuel cell stack because of an error in thickness of the fuel cell components such as the bipolar plates and cooling plates, thus making it difficult to hold the fuel cell components in the horizontal positions.

2. At the greater the height of the stack, a force acting on the lower components becomes larger than that acting on the upper components, thus making it difficult to apply a uniform force to every fuel cell, resulting in lowering in the characteristics of the fuel cell system.

3. The greater the number of fuel cells stacked, the greater is the height of the stack. Thus, the workers are obliged to engage in a dangerous work high above the ground, resulting in lowering in working efficiency and the safety in work operations.

4. Also, at the greater the height of the fuel cell stack, it is difficult to tie up the fuel cell stack to apply a predetermined compressive load to the fuel cell components. Also, if the fuel cell stack become higher, it is difficult to conduct the attachment of manifolds to the fuel stack. In addition, it is impossible to examine the assemblage of the stack to see if it is suitable or not during the working process.

It is therefore an object of the present invention to provide a method for assembling a fuel cell stack with a high accuracy and with safety in work operations.

Another object of the present invention is to provide a device for assembling a fuel cell stack.

According to the present invention, there is provided a method for assembling a fuel cell stack comprising the steps of alternately stacking the prescribed number of fuel cells and bipolar plates to form a plurality of substacks, arranging the laid substacks on a supporting base so that the central axes of the substacks parallel to the stacking direction of the fuel cell stack are on a horizontal straight line to form a complete fuel cell stack, tying up the fuel cell stack to apply a predetermined compressive load to the fuel cell components, making the fuel cell stack vertical, and then removing said supporting base from the fuel cell stack.

According to the present invention, this method can be carried out with a device for assembling a fuel cell stack that comprises a V-shaped supporting base on which a plurality of fuel cell substacks are arranged, a pair of side plates fixed to both ends of the base, a pressure plate slidably arranged on the base, and means for driving said pressure plate in the transverse direction parallel to the stacking direction of the fuel cell stack.

The invention will be further apparent from the following description taken in conjunction with the accompanying drawings.

BRIEF DESCRIPTION OF THE DRAWINGS

FIG. 1 is a perspective view of a substack according to the present invention;

FIG. 2 is a perspective view of a fixing means for a substack used in the method of the present invention;

FIG. 3 is a perspective view showing means for assembling a fuel cell stack, used in the process of the present invention;

FIG. 4 is a perspective view of a complete fuel cell stack according to the present invention; and, FIG. 5 is a sectional view taken on line A—A in FIG. 3.

DETAILED DESCRIPTION OF THE INVENTION

Figure 5:
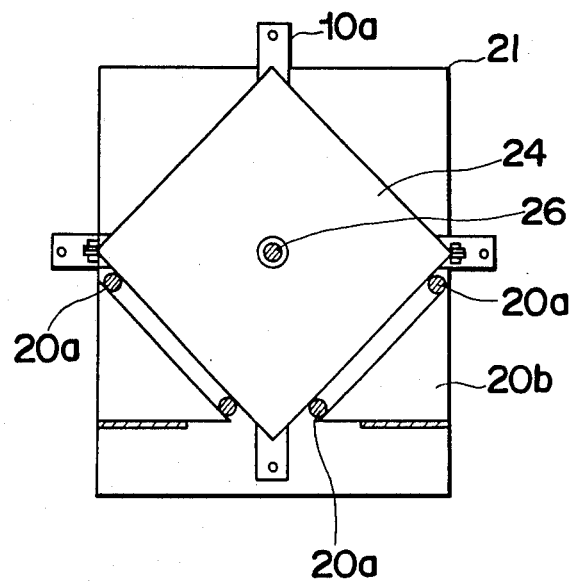

Referring to FIG. 4, there is shown a fuel cell stack 1 comprising a plurality of fuel cells 2, a plurality of bipolar plates 3 each being arranged between neighboring two fuel cells 2, cooling plates 4 arranged every several fuel cells 2, and means for tying up the fuel cell stack to apply a predetermined compressive load to the fuel cell components. The means for tying up the fuel cell comprises a pair of crossed tie bars 10a and 10b and tie rods 11.

Figure 6:
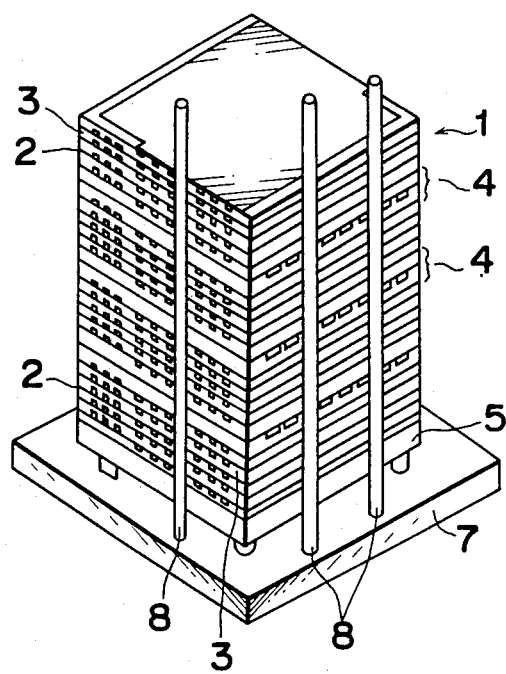
FIG. 6 is a perspective view showing a process of assembling a fuel cell stack according to the prior art.

According to the present invention, the fuel cell stack 1 is assembled in the following manner. In this embodiment, the fuel cell stack comprising three hundred fuel cells is taken by way of example to show order of assembly according to the invention. The fuel cell stack 1 is divided into ten groups each comprising 30 fuel cells. The fuel cells 2 of each group are formed in a substack 14 together with bipolar plates 3 by placing them alternately one on top of the other, and then tying up the substack 1 by means of a preliminary compressive loading means comprising tie bars 12 and tie rods 13, as shown in FIG. 1. A cooling plate 4 is divided into two members 4a and 4b which are respectively arranged on the top and bottom of the substack 14. A pair of preliminary end plates 9 are arranged on the members 4a and 4b. The substack 14 may be constructed with the conventional jig shown in FIG. 6 since no problem occurs if the number of fuel cells is small. Each of the substacks 14 is subjected to a discharging test to examine its assemblage to see if it is suitable or not. If there is no need to carry out the discharging test of the substack, this preliminary compressive loading step may be omitted. After the discharging test, the substack 14 is tied up at its side faces with a pair of angle fixing members 15 by setting them on its side faces and then tightening bolts 16 with nuts 17 shown in FIG. 2 so that the fuel cell components will not slip out of place during assembly operations. The tie bars 12 and the preliminary end plates 9 are then removed from the substack 14. If the fuel cell components such as fuel cells 2 and bipolar plates 3 are united by a bonding agent or any internal connecting means, there is no need to use the above angle fixing means 15 since the structural integrity of the substack is insured.

The substacks 14 are stacked to form a complete fuel cell stack 1 with a device 18 for arrangement of substacks. The device 18 comprises a V-shaped supporting base 20, a pair of side plates 21 and 22 fixed to the ends of the base 20 with screws 23, a pressure plate 24 slidably arranged on the base 20 and connected to a handle 25 by a screw rod 26 engaged with threaded hole provided in the side plate 22, as shown in FIG. 3. The supporting base 20 may be constructed with two pairs of shafts 20a extending between side plates 21 and 22, and spaced reinforcing plates 20b fixed to two shafts of each pair. In this case, the two pairs of the shafts 20a are so arranged that the planes including the axes of the two shafts of each pair are at a right angle to each other. The supporting base 20 may be constructed by two plates (not shown) arranged to form a V-shaped space between them. The pressure plate 24 may be driven by a hydraulic cylinder or an electric motor with a reduction gear.

A complete fuel cell stack 1 is assembled in the following manner. A crossed tie bar 10a and an end plate 5a are in turn positioned on the supporting plate 20, and then the substacks 14 are placed in a row on the supporting base 20 so that the central axis of each substack parallel to its stacking direction are on a horizontal straight line. A sealing member of an electrically conductive material is arranged between the adjacent substacks to form a seal between the members 4a and 4b of the cooling member 4. During an assembly operation, the pressure plate 24 is moved back and forth every additional several substacks by turning the handle 25 to clamp the substacks 14. After the prescribed number (in this embodiment, 10) of the substacks are arranged in a row and the pressure plate 24 is returned to the original position near the side plate 22, an end plate 5a and a crossed tie bar 10a are in turn placed on the supporting base 20 and then the fuel cell stack 1 is tied and a predetermined compressive load is applied by the tie bars 10a and 10b and tie rods 11.

The fuel cell stack 1 is then made vertical together with the device 18. Subsequently the device 18 and the fixing members 15 are in turn removed from the stack 1 to mount the manifolds on the respective sides of the fuel cell stack. The fixing members 15 of each pair in the upper portion of the stack 1 may be taken off from the fuel cell stack by removing the bolts 16 and nuts 17 before making the fuel cell stack vertical but after tying up the fuel cell stack with tie bars 10a, 10b and tie rods 11. In this case, the manifolds may be mounted on the neighbouring two upper sides of the fuel cell stack placed horizontally on the supporting base 20.

According to the present invention, the fuel cells are preliminarily assembled in substacks which are then stacked in the transverse direction to form a complete fuel cell stack and tied up by tie bars and tie rods as it stands in the horizontal position, thus making it possible to improve a stacking accuracy and working operations. It is also possible to prevent the operators from a dangerous work high above the ground, thus making it possible to improve the safety in the working operation. Accordingly, the present invention makes it possible to assemble the fuel cell stack with safety and a high efficiency in operation even if the number of cells is 300 and over.

What we claim is:

1. A method for assembling a fuel cell stack comprising the steps of alternately stacking the prescribed number of fuel cells and bipolar plates to form a plurality of substacks, arranging the laid substacks on a supporting base so that the central axes of the substacks parallel to the stacking direction of the fuel cell stack are on a horizontal straight line to form a complete fuel cell stack, tying up the fuel cell stack to apply a predetermined compressive load to the fuel cell components, making the fuel cell stack vertical, and then removing said supporting base from the fuel cell stack.

2. The method according to claim 1 wherein the substack is tied up at its sides with a pair of angle fixing members and then arranged on the supporting base.

3. The method according to claim 2 wherein the angle fixing members are removed after the fuel cell stack has been applied a compressive load.

4. The method according to claim 2 wherein the angle fixing members are removed after the fuel cell stack has been made vertical.

5. A device for assembling a fuel cell stack comprising a V-shaped supporting base on which a plurality of fuel cell substacks are arranged, a pair of side plates fixed to both ends of the base, a pressure plate slidably mounted on the base, and means for driving said pressure plate in the transverse direction parallel to the stacking direction of the fuel cell stack.

* * * * *